(12) United States Patent
Sachs et al.

(10) Patent No.: US 8,781,805 B1
(45) Date of Patent: Jul. 15, 2014

(54) SIMULATING FLUID STRUCTURES

(75) Inventors: Ian D. Sachs, San Francisco, CA (US); Nicholas Grant Rasmussen, Fairfax, CA (US)

(73) Assignee: Lucasfilm Entertainment Company, Ltd., San Francisco, CA (US)

( * ) Notice: Subject to any disclaimer, the term of this patent is extended or adjusted under 35 U.S.C. 154(b) by 457 days.

(21) Appl. No.: 13/069,743

(22) Filed: Mar. 23, 2011

Related U.S. Application Data

(60) Provisional application No. 61/367,187, filed on Jul. 23, 2010.

(51) Int. Cl.
*G06G 7/50* (2006.01)

(52) U.S. Cl.
USPC ............................................................ 703/9

(58) Field of Classification Search
None
See application file for complete search history.

(56) References Cited

PUBLICATIONS

Rasmussen, N., Enright, D., Nguyen, D. Q., Marino, S., Sumner, N., Geiger, W., Hoon, S., and Fedkiw, R. P. 2004. Directable photorealistic liquids. In Proc. ACM/Eurographics Symp. Comp. Anim., 193-202.*
Hong, J.-M., and Kim, C.-H. 2004. Controlling fluid animation with geometric potential: Research articles. Comput. Animat. Virtual Worlds 15, 3-4, 147-157.*
Michael B. Nielsen and Robert Bridson. 2011. Guide shapes for high resolution naturalistic liquid simulation. ACM Trans. Graph. 30, 4, Article 83 (Jul. 2011), 8 pages.*
Thurey, N., Keiser, R., Pauly, M., and Rude, U. 2006. Detail-preserving fluid control. In Proc. ACM/Eurographics Symp. Comp. Anim., 7-12.*
N. Thurey, R. Keiser, M. Pauly, U. Rude, Detail-preserving fluid control, Graphical Models, vol. 71, Issue 6, Nov. 2009, pp. 221-228.*
Losasso, F., Shinar, T. Selle, A. and Fedkiw, R., "Multiple Interacting Liquids", SIGGRAPH 2006, ACM TOG 25, 812-819 (2006).*
Viorel Mihalef, Samet Kadioglu, Mark Sussman, Dimitris Metaxas, Vassilios Hurmusiadis, Interaction of two-phase flow with animated models, Graphical Models, vol. 70, Issue 3, May 2008, pp. 33-42, ISSN 1524-0703, http://dx.doi.org/10.1016/j.gmod.2007.10.001. (http://www.sciencedirect.com/science/article/pii/S1524070307000264).*
Eckstein, I., Tong, Y., Kuo, C.-C. J., and Desbrun, M. 2007. Volume controlled surface fairing. In ACM SIGGRAPH 2007 Sketches.

(Continued)

*Primary Examiner* — Omar Fernandez Rivas
*Assistant Examiner* — Robert Brock
(74) *Attorney, Agent, or Firm* — Kilpatrick Townsend & Stockton LLP

(57) ABSTRACT

A system includes a computing device that includes a memory configured to store instructions. The computing device also includes a processor configured to execute the instructions to perform a method that includes defining a simulated fluid object that includes a first portion and a second portion being represented by a signed distance function. The method also includes applying at least one constraint to the first portion of the simulated fluid object to match a velocity of a target. The method also includes applying a collection of calculated forces to the second portion of the simulated fluid object. Also, the method includes rendering the first portion applied with the at least one constraint and the second portion applied with the collection of calculated forces to present the simulated fluid object.

27 Claims, 9 Drawing Sheets

(56) References Cited

PUBLICATIONS

Enright, D., Marschner, S., and Fedkiw, R. 2002. Animation and rendering of complex water surfaces. ACM Trans. Graph. vol. 21, Issue 3, 736-744.

Losasso, F., Talton, J., Kwatra, N., and Fedkiw, R. 2008. Two-way coupled SPH and particle level set fluid simulation. IEEE Transactions on Visualization and Computer Graphics 14, 4, 797-804.

Shi, L., and Yu, Y. 2005. Taming liquids for rapidly changing targets. In Proceedings of the 2005 ACM SIGGRAPH/Eurographics Symposium on Computer Animation, 229-236.

Zhu, Y., and Bridson, R. 2005. Animating sand as a fluid. In SIGGRAPH '05: ACM SIGGRAPH 2005 Papers. ACM Transactions on Graphics (TOG)—Proceedings of ACM SIGGRAPH 2005. vol. 24, Issue 3, Jul. 2005, 8 pages.

* cited by examiner

SIMULATING FLUID STRUCTURES

CLAIM OF PRIORITY

This application claims priority under 35 USC §119(e) to U.S. Patent Application Ser. No. 61/367,187, filed on Jul. 23, 2010, the entire contents of which are hereby incorporated by reference.

TECHNICAL FIELD

This document relates to producing and presenting virtual structures seemingly constructed of simulated fluids such as water.

BACKGROUND

With the ever-increasing desire for creating realistic virtual scenes and characters for animated movies, video games, etc., the use of computational simulations such as fluid simulations have exponentially increased. Such simulations allow characters to be produced that appear to be entirely made of a liquid such as a molten metal or water. To produce convincing characters or objects, along with simulating a fluid, realistic fluid dynamics need to be presented. While relatively stationary objects (e.g., a pool of water) may be simulated to present realistic liquid properties, simulation techniques may have difficulty in presenting fluid properties of rapidly changing structures (e.g., a running human-like figure seemingly comprised of water).

SUMMARY

The systems and techniques described here relate to simulating and presenting rapidly moving objects that are seemingly constructed of a fluid-like substance.

In one aspect, a computer-implemented method includes defining a simulated fluid object that includes a first portion and a second portion being represented by a signed distance function. The method also includes applying at least one constraint to the first portion of the simulated fluid object to match a velocity of a target. The method also includes applying a collection of calculated forces to the second portion of the simulated fluid object. Also, the method includes rendering the first portion applied with the at least one constraint and the second portion applied with the collection of calculated forces to present the simulated fluid object.

Implementations may include any or all of the following features. Applying at least one constraint to the first portion of the simulated fluid object may include assigning a velocity to the first portion that is equivalent to the velocity of the target. Applying at least one constraint to the first portion of the simulated fluid object may include substantially matching the shape of the first portion to the shape of the target. Applying at least one constraint to the first portion of the simulated fluid structure may include enforcing a boundary condition to the first portion of the simulated fluid structure. The first portion may be located within the second portion of the simulated fluid object. The second portion may define an outer surface of the simulated fluid object. The collection of calculated forces may include a potential force applied to the second portion of the simulated fluid object. The collection of calculated forces may include a velocity matching force applied to the second portion of the simulated fluid object for matching a velocity of the second portion to a velocity of the target. The collection of calculated forces may include a shape matching force applied to the second portion of the simulated fluid object for matching the shape of the second portion to the shape of the target. The collection of calculated forces may be a weighted sum of a potential force, a velocity matching force and a shape matching force.

In another aspect, a computer program product tangibly embodied in an information carrier and comprising instructions that when executed by a processor perform a method that includes defining a simulated fluid object that includes a first portion and a second portion being represented by a signed distance function. The method also includes applying at least one constraint to the first portion of the simulated fluid object to match a velocity of a target. The method also includes applying a collection of calculated forces to the second portion of the simulated fluid object. Also, the method includes rendering the first portion applied with the at least one constraint and the second portion applied with the collection of calculated forces to present the simulated fluid object.

Implementations may include any or all of the following features. Applying at least one constraint to the first portion of the simulated fluid object may include assigning a velocity to the first portion that is equivalent to the velocity of the target. Applying at least one constraint to the first portion of the simulated fluid object may include substantially matching the shape of the first portion to the shape of the target. Applying at least one constraint to the first portion of the simulated fluid structure may include enforcing a boundary condition to the first portion of the simulated fluid structure. The first portion may be located within the second portion of the simulated fluid object. The second portion may define an outer surface of the simulated fluid object. The collection of calculated forces may include a potential force applied to the second portion of the simulated fluid object. The collection of calculated forces may include a velocity matching force applied to the second portion of the simulated fluid object for matching a velocity of the second portion to a velocity of the target. The collection of calculated forces may include a shape matching force applied to the second portion of the simulated fluid object for matching the shape of the second portion to the shape of the target. The collection of calculated forces may be a weighted sum of a potential force, a velocity matching force and a shape matching force.

In another aspect, a system includes a computing device that includes a memory configured to store instructions. The computing device also includes a processor configured to execute the instructions to perform a method that includes defining a simulated fluid object that includes a first portion and a second portion being represented by a signed distance function. The method also includes applying at least one constraint to the first portion of the simulated fluid object to match a velocity of a target. The method also includes applying a collection of calculated forces to the second portion of the simulated fluid object. Also, the method includes rendering the first portion applied with the at least one constraint and the second portion applied with the collection of calculated forces to present the simulated fluid object.

Implementations may include any or all of the following features. Applying at least one constraint to the first portion of the simulated fluid object may include assigning a velocity to the first portion that is equivalent to the velocity of the target. Applying at least one constraint to the first portion of the simulated fluid object may include substantially matching the shape of the first portion to the shape of the target. Applying at least one constraint to the first portion of the simulated fluid structure may include enforcing a boundary condition to the first portion of the simulated fluid structure. The first portion may be located within the second portion of the simulated fluid object. The second portion may define an outer surface of the simulated fluid object. The collection of calculated forces may include a potential force applied to the second portion of the simulated fluid object. The collection of calculated forces may include a velocity matching force applied to the second portion of the simulated fluid object for matching a velocity of the second portion to a velocity of the target. The collection of calculated forces may include a shape matching force applied to the second portion of the simulated fluid object for matching the shape of the second portion to the shape of the target. The collection of calculated forces may be a weighted sum of a potential force, a velocity matching force and a shape matching force.

Details of one or more implementations are set forth in the accompanying drawings and the description below. Other features, aspects and advantages will be apparent from the description and drawings, and from the claims.

DETAILED DESCRIPTION

Figure 1:
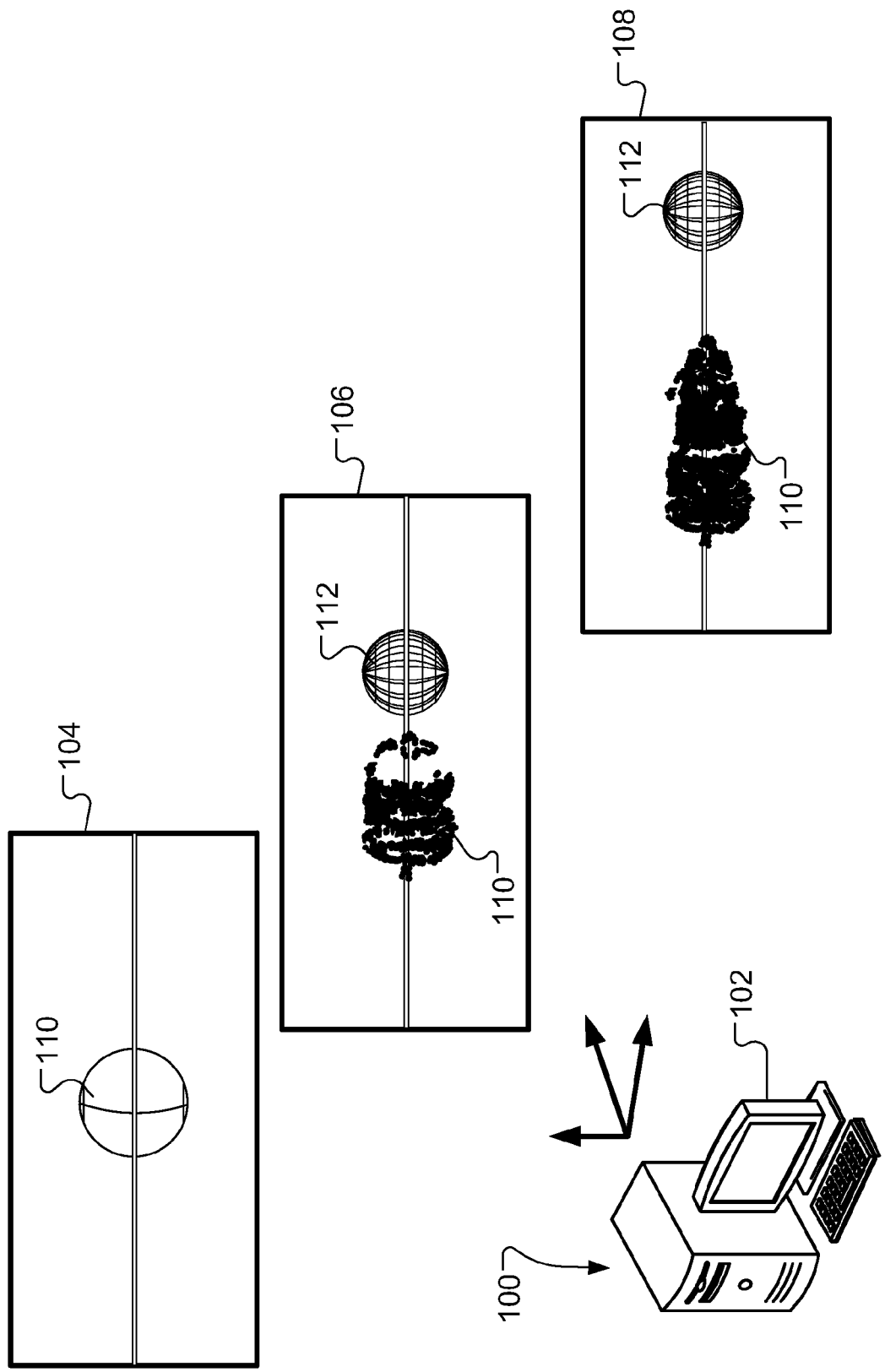
FIGS. 1 and 2 illustrate simulated objects seemingly constructed of fluid.

Referring to FIG. 1, a computing device 100 (e.g., a computer system) is illustrated as presenting (on a display screen 102) a series of three images 104, 106, 108 of a simulated spherically-shaped object 110 (e.g. a droplet) seemingly constructed of a fluid (e.g., water) and rapidly accelerating over a period of time. Each of the images represents a distinct moment in time, and in the image 104, the simulated fluid object 110 appears as being at rest. Illustrated as rapidly accelerating in the image 106, the simulated object has difficulty following a spherical mesh 112 that represents the underlying structure a desired target shape of the simulated fluid object 110. To govern the motion of a fluid-like substance that seemingly comprises the simulated fluid object 110, one or more techniques may be implemented. For example, forces (referred to as control forces) may be calculated to drive the fluid characteristics by reducing shape and velocity discrepancies between the simulated fluid object 110 and a desired shape (referred to as a target shape), in this instance the spherical mesh 112. However, upon significant accelerations being introduced, control forces may be insufficient for a simulated fluid object to match or retain a target shape. In this particular illustration, the simulated fluid object 110 is unable to match the velocity of the rapidly accelerated spherical mesh 112. Continuing to accelerate, as illustrated in image 108, the simulated fluid object 110 is completely separated from the spherical mesh 112. As such, for this example the control force model appears incapable of simulating an object seemingly constructed of a fluid-like substance that has been rapidly accelerated or decelerated.

Figure 2:
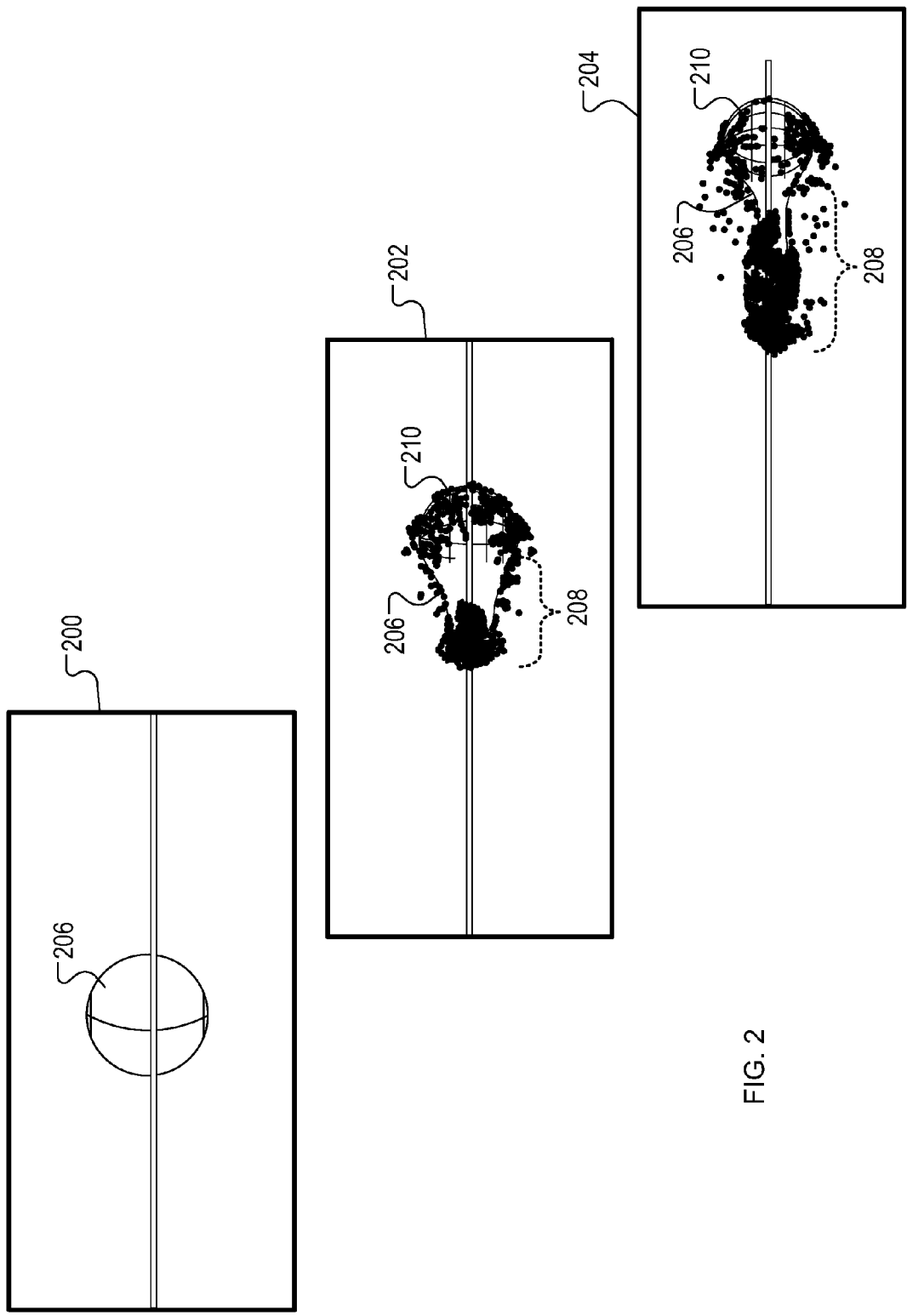

Referring to FIG. 2, a series of three images 200, 202, 204 illustrates a simulated fluid object being accelerated. However, unlike the object 110 shown in FIG. 1, the simulated fluid substance substantially matches and retains the shape and velocity of a target shape. In particular, image 200 presents a simulated fluid object 206 that appears at rest. As the object 206 is accelerated, as illustrated in image 202, a fluid tail 208 develops and individual particles detach from the simulated fluid object 206. Unlike the object shown in image 106 of FIG. 1, the simulated fluid object is able to match and retain the shape and velocity of a target shape (e.g., represented with a spherical mesh 210). Further accelerated, the fluid tail 208 continues to grow (as illustrated in image 204) but the simulated fluid object 206 is still able to follow the spherical target shape. As such, the simulated fluid object 206 can substantially match the shape and velocity of rapidly changing target shape (e.g., a spherical mesh) while presenting realistic physical characteristics of a fluid.

One or more techniques and methodologies may be implemented to simulate objects seemingly constructed by a fluid-like substance that may follow a rapidly changing target shape (e.g., accelerated, decelerated, etc.). For example, calculated control forces may be augmented such that a simulated fluid object can match the motion of a rapidly changing object while also preserving realistic physical properties of the fluid. For example, one or more constraints may be placed on the simulated fluid. Such constraints may be applied by using one or more methods, for example, velocities of particular portions of the simulated object may be explicitly incorporated into a velocity field computed from control forces.

Figure 3:
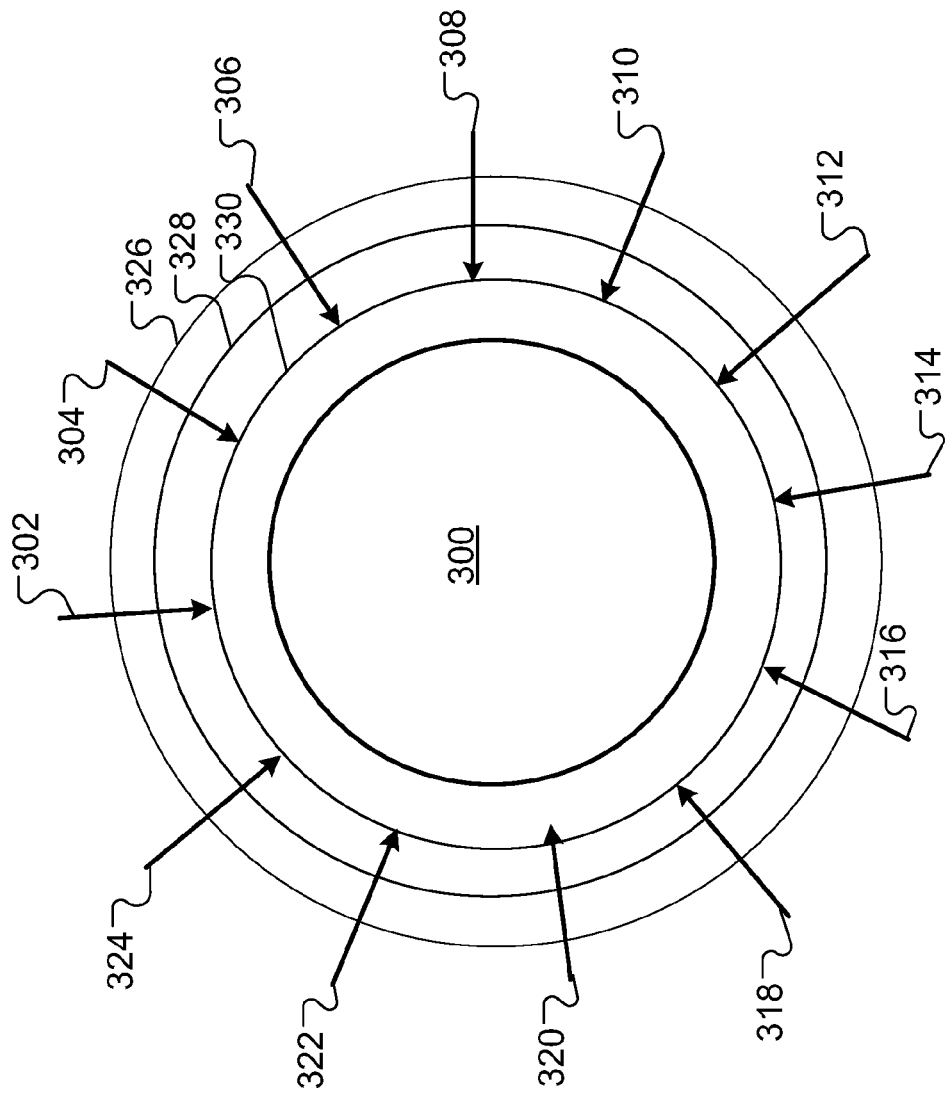
FIGS. 3-5 illustrate forces computed for simulating fluid structures.
Figure 4:
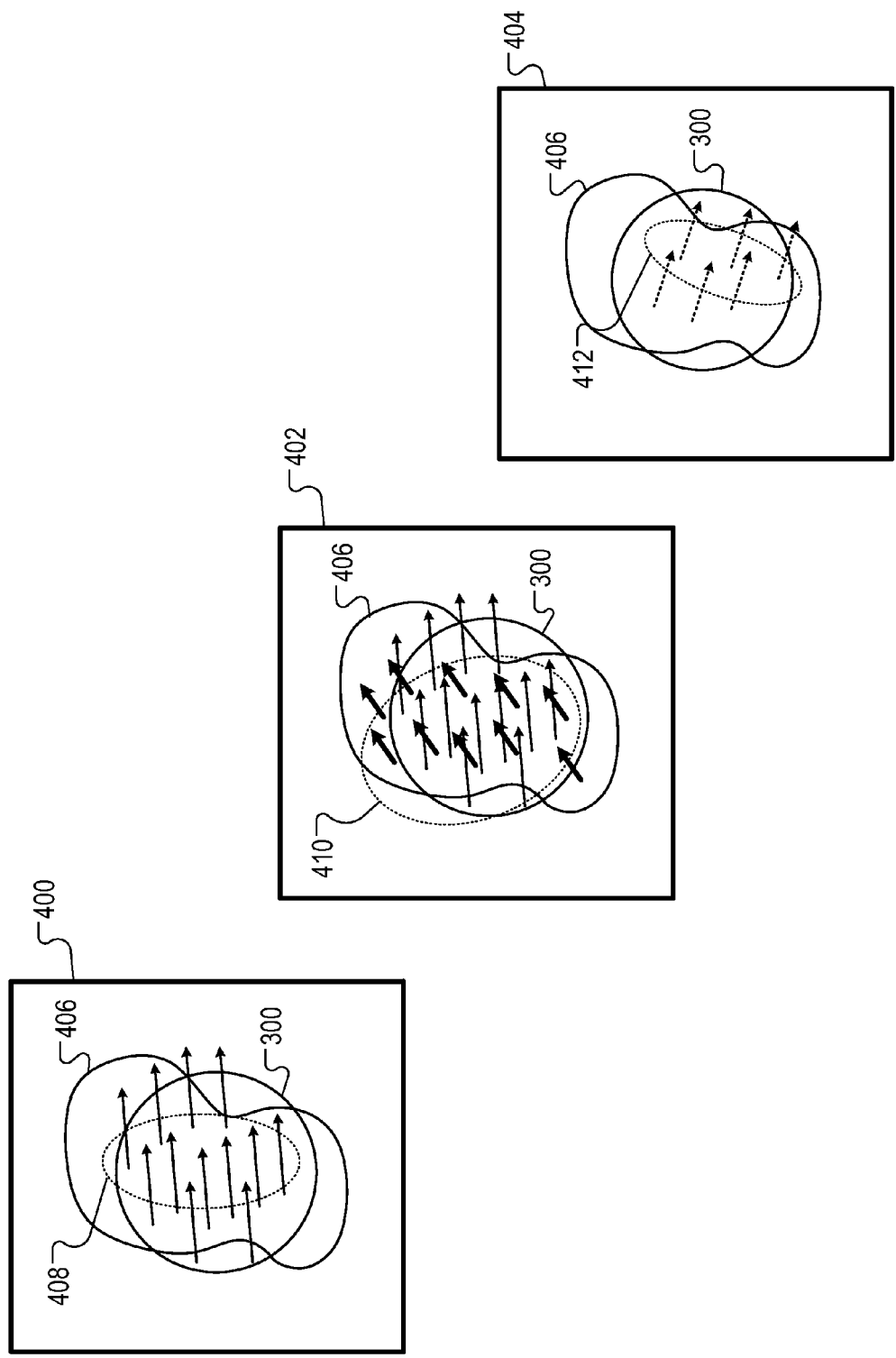
Figure 5:
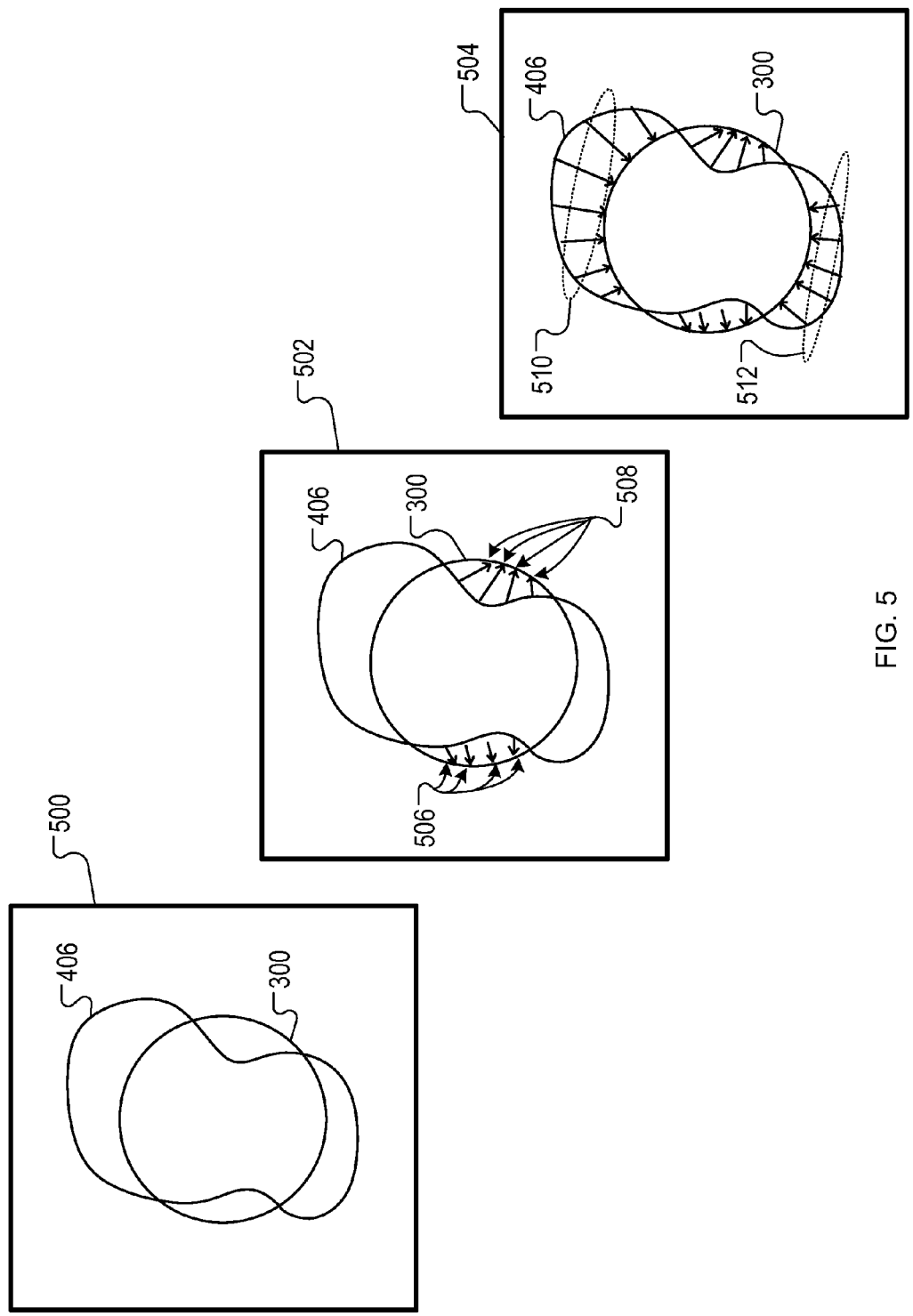

Referring to FIGS. 3-5, three types of calculated control forces are graphically illustrated. In general, control forces are used in physics-based fluid simulations for various applications such as controlling a simulated fluid to match target shapes that represent non-fluid objects (e.g., a humanoid form or other types of creatures). Computing and using such control forces, the natural movement and appearance of the fluid is retained for presentation. Control forces can be considered as a weighted sum of three separately computed forces that together may assist a simulated fluid conform to a target shape. For example, the three forces may include a potential force, a velocity matching force and a shape matching force. With respect to control theory, these three forces may also be considered as being analogous to a proportional force, a derivative force and an integral force of a proportional integral derivative (PID) controller that attempts to minimize the difference between a measured quantity and a setpoint.

Referring to FIG. 3, a circular shape is illustrated as an example target shape 300 to which a simulated fluid is conformed. By calculating a potential force for the target shape 300, the physical properties of the shape and the surrounding space may be adjusted for acclimating a simulated fluid introduced into the space. As such, the potential force is calculated absent information about the simulated fluid and may be based upon geometrical information, for example, provided by an animator (e.g., geometry of the target shape, boundaries of the simulation space, etc.). As described in *Controlling Fluid Animation with Geometrical Potential* by J. M. Hong and C. H. Kim (Computer Animation and Virtual Worlds, 15, 3-4 (2004)), which is herein incorporated by reference in its entirety, one or more potential dimensions may be added to a simulation space and adjusted for a target shape. As illustrated in the figure, the negative gradient (represented by arrows 302-324) of a signed distance function (represented by isocontours 326-330) of the target shape 300 can define the potential force that configures the simulation space.

Referring to FIG. 4, three images 400, 402, 404 illustrate the application of a velocity force for substantially matching the velocity of a simulated fluid to the velocity of a target shape (e.g., the velocity of an accelerating target shape at one time instance). Along with the potential force, the velocity force can be used to produce realistic representations of fluid characteristics for a portion of an object (e.g., a region that includes the outer surface of the object). Unlike calculating a potential force as illustrated in FIG. 3, a velocity matching force calculation takes the simulated fluid into account. In this particular example, a simulated fluid 406 has a shape that is quite different from the circular target shape 300. One or more techniques may be implemented to define the velocity force for matching the velocity of the target shape. For example, the difference between the velocity of the target shape and the fluid velocity may be calculated and applied e.g., through vector addition. In image 400, the velocity of corresponding portions of the target shape is represented by relatively thin arrows (highlighted by dashed-line loop 408) in which the direction of the arrows represent velocity direction and arrow length represents the speed of the target shape 300. Image 402 introduces the velocity of the simulated fluid, as represented by thicker arrows (highlighted by a dashed-line loop 410) in which the direction of the arrows represent velocity direction and arrow length represents speed. In comparison, the direction of the target shape velocity is roughly horizontal with a faster speed (compared to the speed of the simulated fluid). To have the fluid velocity substantially match the velocity of the target shape 300, one or more vector quantities may be calculated that represent the difference between the velocities of the target shape 300 and the velocities for the simulated fluid 406. In image 404, vector quantities are illustrated with dashed-line arrows (as highlighted by dashed-line loop 412) that represent forces for adjusting the simulated fluid velocities to match the target shape velocities. In one arrangement, the forces provide vector quantities that represent the difference between the target shape velocities and the simulated fluid velocities. Through vector addition, the velocity of the simulated fluid 406 may be matched to the velocity of the target shape 300.

Referring to FIG. 5, three images 500, 502, 504 illustrate a shape matching force being calculated and applied such that the shape of a simulated fluid substantially matches a target shape. Continuing with the example illustrated in FIGS. 3 and 4, the shape matching force is used to adjust the shape of the simulated fluid 406 to match the circular target shape 300. One or more techniques may be implemented to calculate such a shape matching force. For example, a signed distance function may be used to represent the target shape 300. For one function representation, location positions external to the target shape surface and with increasing distances from the surface are represented with increasing positive distance values. Similarly, locations positions internal to the target shape 300 and approaching the center of the target shape are represented with decreasing negative distance values. Location points on the surface of the target shape are represented by zero distance values. Shape matching forces can be calculated based on distance differences between the target shape 300 and the shape of the simulated fluid 406. For example, portions of the simulated fluid located external to the target shape may be pushed along a negative gradient of the signed distance function of the target object until arriving at the target shape geometry. Similarly, the geometry of simulated fluid portions internal to the target geometry may be pushed in an outward direction along a normal from the simulated fluid shape. To demonstrate, similar to FIG. 4, the image 500 again presents the circular geometry of the target shape 300 and the non-matching geometry of the simulated fluid 406. In image 502, attempting to match the target shape 300, the portions of the simulated fluid respectively located internal to the target shape are pushed towards the surface of the target shape. As represented in the image 502 (with two groups of arrows 506 and 508), portions of the fluid shape 406 are pushed outward (along respective normal vectors of the fluid shape surface) to the surface of the target shape 300 based upon the distance differences. Similarly, but in a direction defined by negative normal vectors as illustrated with inward pointing arrows (highlighted by dashed-lined loops 510 and 512), corresponding portions of the simulated fluid shape 406 geometry are pushed inward to the surface of the circular target shape 300 based on the distance differences of the two surfaces. As such, the shape matching force can be considered as adjusting the shape of the simulated fluid to comply with the target shape. Additional operations may also be included with calculating and applying a shape matching force. For example, one or more corrections may be applied to the shape matching force for retaining a zero value divergence to reduce distortion during pressure projection during simulation. Such a correction, along with calculating velocity and shape matching forces is described in *Taming Liquids for Rapidly Changing Target* by L. Shi and Y. Yu (ACM SIGGRAPH Symposium on Computer Animation (2005)), which is herein incorporated by reference in its entirety.

Figure 6:
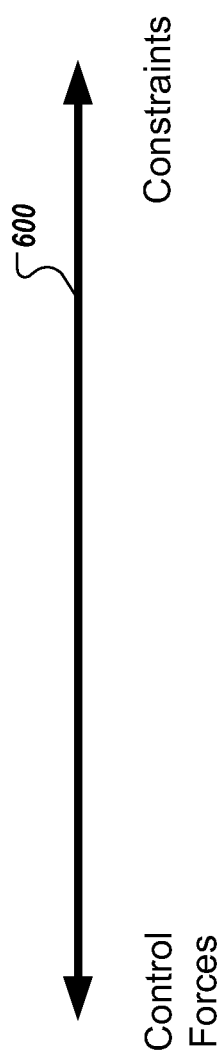
FIG. 6 illustrates a continuum for controlling portions of a simulated fluid structure.

Referring to FIG. 6, by calculating and applying (e.g., with a weighted sum) such control forces (e.g., potential, velocity and shape matching forces) a simulated fluid object may track the shape and relatively slow motion of a target geometry while providing the appearance of natural fluid dynamics (e.g., physical properties of water). However, such control forces may be unable to track a rapidly changing target shape (e.g., changing shape, accelerating, decelerating, etc.) and may result in a simulated fluid object that appears stiff and that does not appropriately present the fluid being simulated. To provide such tracking capabilities, one or more techniques may be implemented, for example, to compliment the capabilities of control forces for fast moving targets. For example, one or more constraints may be calculated and enforced upon the simulated fluid. In some arrangements, boundary conditions may be applied to the simulated fluid to provide such constraints. Additionally, based on the target shape and the simulation (e.g., a slowly moving target simulation, a quickly accelerating target simulation, etc.) the influence of the control forces and the constraints may be adjusted. For example, control forces may be more useful to provide the physical fluid characteristics needed for simulating a relatively stationary target shape while implementing constraints may be more useful to appropriately match the velocity and shape of an extremely fast moving target shape. As such, the applied techniques may be represented on a controllability continuum (as illustrated with a double-sided arrow 600). At one end of the continuum, control forces may be exclusively used for controlling a simulation (e.g., of a slow moving or stationary target shape). At the other end, constraints (e.g., boundary conditions) may be used for properly controlling a rapidly changing target shape. Between the extremes, a combination of the control forces and constraints may be applied.

One or more techniques may be used for applying such constraints to a simulated fluid object to match a rapidly changing (e.g., accelerating) target shape. For example, velocities of the target shape may be directly mapped to the velocities of the simulated fluid object. In one embodiment the mapping of the velocities of the target shape may be by blending from the velocity of the target shape to the velocities of the simulated fluid object. The blending in one embodiment may be a linear blending. As such, target velocities are directly enforced upon the simulated fluid object. Similarly, control forces may be calculated and applied in appropriate situations (e.g., a slow moving target shape) for controlling velocity. Similar to applying constraints to velocities, constraints may also be applied to the shape of a simulated fluid object for matching a target shape. Along with applying the controllability continuum to an entire simulated fluid object to match a target shape (e.g., to achieve velocities of a target shape), the simulated fluid object may be segmented into regions and each segment may be governed by similar or different portions of the continuum. For example, an inner portion of the simulated fluid object may be governed by constraints (e.g., for matching and retaining the velocities of a rapidly changing target shape) and an outer portion of the simulated fluid object may be governed by control forces (e.g., for presenting realistic fluid characteristics).

Figure 7:
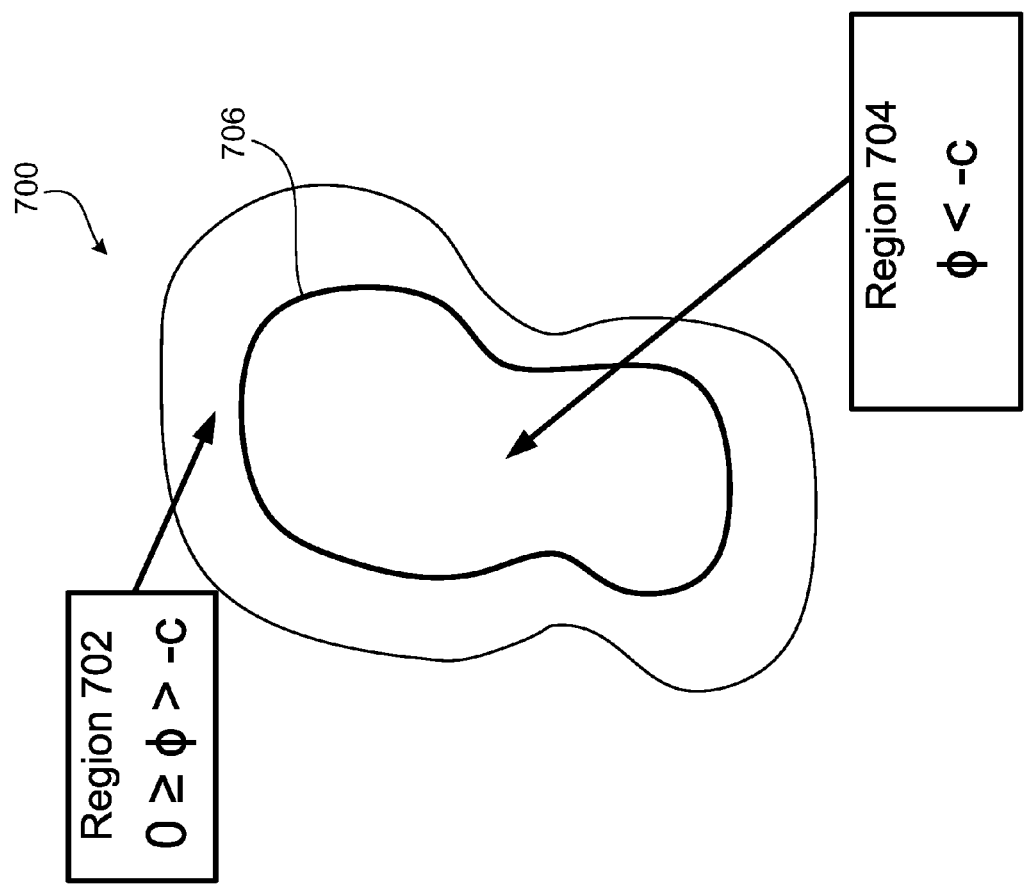
FIG. 7 illustrates regions of a simulated fluid structure.

Referring to FIG. 7, a simulated fluid object 700 includes two distinct regions 702, 704 that may be governed by different portions of the controllability continuum (shown in FIG. 6). In this example, a signed distance function is used to define the two regions 702, 704 of the simulated fluid shape. In particular, an exterior surface 706 is assigned a distance value of zero and defines the outer surface of region 702. Extending inwards, a variable $\phi$ represents the distance traveled. An isocontour of $\phi=-C$, defines the inner boundary of the region 702, and also the outer surface of the region 704. Continuing inward, the region 704 extends to the center of the object, as such $\phi<-C$ is included in the signed distance function to define this region. While two regions are defined in this particular example, more or less regions may be included in other arrangements. Further, while each region is concentric with respect to the simulated fluid object 700, other types of segmenting may be implemented. For example, with respect to being placed into motion, a leading portion of a simulated fluid object may be defined as a region that is governed by one portion of the controllability continuum while a trailing portion of the object may be defined as a second region and is controlled by another portion of the continuum.

In this particular example, the inner region 704 (as defined by the signed distance function) of the simulated fluid object 700 is governed by the one or more constraints to assure that the velocity of object matches the velocity of a target shape. Additionally, one or more constraints may be introduced such that the shape of the simulated fluid object approaches the target shape. By assigning this portion of the controllability continuum to the region 704, a "hard control" is applied by fixing a velocity field within this region. Additionally, constraints may be applied by enforcing one or more boundary conditions (e.g., Neumann type boundary conditions) to a portion of the region 704. Such hard controls are further described in *Directable Photorealistic Liquids* by N. Rasmussen et al. (ACM SIGGRAPH Symposium on Computer Animation (2004)), which is herein incorporated by reference in its entirety. Through this assignment, the region 704 of the simulated fluid object 700 can track the movements of the target shape and thereby reduce the probability of the simulated fluid object 700 being unable to follow a target shape (e.g., a mesh), specially a rapidly changing target shape.

To provide fluid-like properties to the outer region 702 (also defined with the signed distance function), control forces are calculated and used for this portion of the simulated fluid object 700. For example, a potential force, a velocity matching force and a shape matching force may be calculated and applied to the region 702. As such, while the inner region 704 is bound to the velocities and the shape of the target shape, the calculated control forces define less constrained properties and motion of the simulated fluid within this region 702 of the simulated fluid object 700. As such, the fluid-like physical properties of region 702 may appear more realistic than the properties of the region 704. However, the applied constraints may assure that the simulated fluid object 700 closely tracks the target shape.

Figure 8:
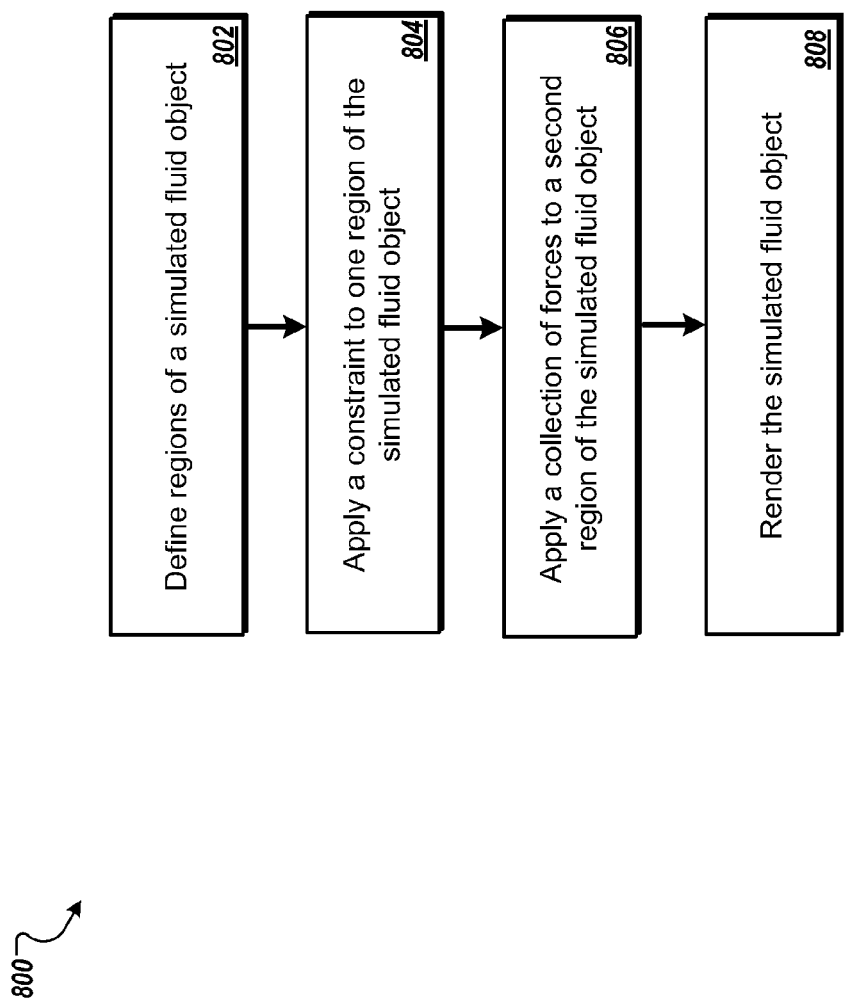
FIG. 8 is a flow chart of operations for producing simulated fluid structures.

Referring to FIG. 8, a flowchart 800 represents operations of a computing device such as the computer system 100 to produce one or more objects seemingly constructed of a fluid-like substance. Such operations are typically executed by components (e.g., one or more processors) included in a computing device, however, operations may be executed by multiple computing devices. Along with being executed at a single site (e.g., at the location of the computer system 100), execution of the operations may be distributed among two or more locations.

Operations of the computing device may include defining 802 regions of a simulated fluid object. For example a signed distance function may be used to define an inner and outer region of an object that is seemingly produced from a simulated liquid substance. Operations may also include applying 804 one or more constraints to one of the defined regions. For example, the velocity of the inner region may be constrained by matching it to a velocity of a target. As such, the simulated fluid object matches the target velocity and shape and the probability of the simulated fluid object being unable to follow the target is significantly reduced. Operations may also include applying 806 a collection of calculated forces to another one of the defined regions. For example, a region that defines the exterior of the simulated fluid object may be applied with a weighted sum of calculated forces. These forces may include a potential force, a velocity matching force and a shape matching force. By applying this collection of forces, the exterior of the simulated fluid object may visually present realistic properties of a fluid-like substance may appear more fluid-like to an observer (compared to the inner region). Application of the calculated forces may also include operations, such as evolving the simulated fluid object. Operations may also include rendering 808, e.g., on a display of the computing device, the processed regions to present the simulated fluid object.

Figure 9:
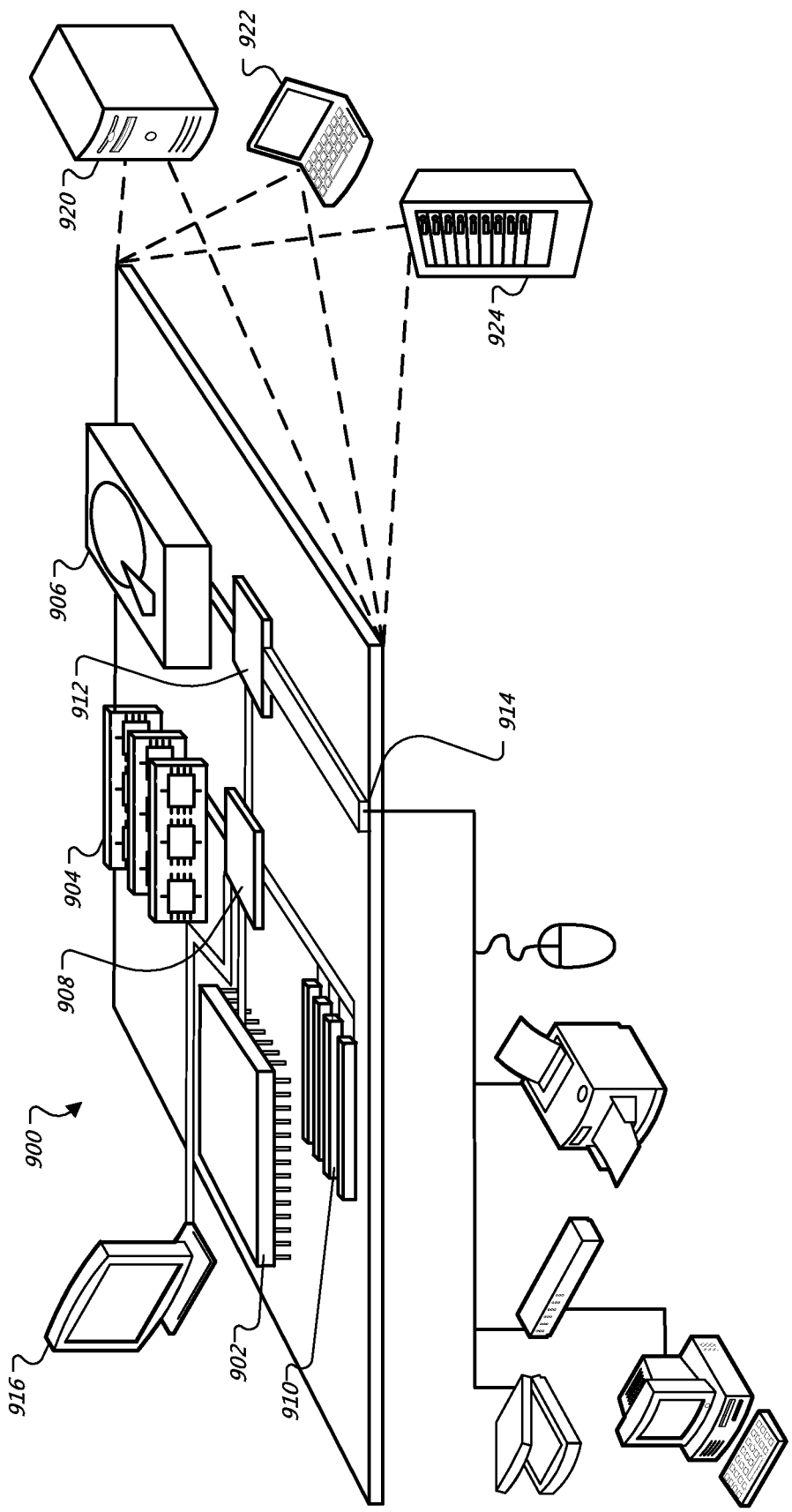
FIG. 9 is a block diagram of computing devices and systems.

FIG. 9 is a block diagram of computing devices that may be used and implemented to perform operations associated with producing objects seemingly constructed of fluid-like substances. Computing device 900 can also represent various forms of digital computers, such as laptops, desktops, workstations, personal digital assistants, servers, blade servers, mainframes, and other appropriate computers.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses can be used, as appropriate, along with multiple memories and types of memory. Also, multiple computing devices 900 can be connected, with each device providing portions of the necessary operations (e.g., as a server bank, a group of blade servers, or a multi-processor system).

The memory 904 stores information within the computing device 900. In one implementation, the memory 904 is a computer-readable medium. In one implementation, the memory 904 is a volatile memory unit or units. In another implementation, the memory 904 is a non-volatile memory unit or units.

The storage device 906 is capable of providing mass storage for the computing device 900. In one implementation, the storage device 906 is a computer-readable medium. In various different implementations, the storage device 906 can be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 904, the storage device 906, memory on processor 902, or the like.

The high speed controller 908 manages bandwidth-intensive operations for the computing device 900, while the low speed controller 912 manages lower bandwidth-intensive operations. Such allocation of duties is exemplary only. In one implementation, the high-speed controller 908 is coupled to memory 904, display 916 (e.g., through a graphics processor or accelerator), and to high-speed expansion ports 910, which can accept various expansion cards (not shown). In the implementation, low-speed controller 912 is coupled to storage device 906 and low-speed expansion port 914. The low-speed expansion port, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. It can also be implemented as part of a rack server system 924. In addition, it can be implemented in a personal computer such as a laptop computer 922. Alternatively, components from computing device 900 can be combined with other components in a mobile device (not shown).

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer-implemented method comprising:
defining a simulated fluid object that includes a first portion and a second portion, wherein the first portion is located within the second portion and a boundary of the second portion defines an outer surface of the simulated fluid object, the portions being defined by a signed distance function (SDF) so that the first portion is defined as a region of the simulated fluid object in which the SDF is less than or equal to a negative real number and the second portion is defined as a region of the simulated fluid object in which the SDF is both greater than the negative real number and less than or equal to 0;
performing a fluid flow simulation that includes the simulated fluid object;
during the fluid flow simulation assigning at least one velocity constraint to the first portion of the simulated fluid object to correspond to a velocity of a target shape;
applying during the fluid flow simulation at least one of a collection of calculated control forces to the second portion of the simulated fluid object; and
rendering results of the fluid flow simulation to generate at least one image of the simulated fluid object.

2. The computer-implemented method of claim 1, in which the velocity of the target shape is extrapolated into the velocity field of the entire simulated fluid object.

3. The computer-implemented method of claim 2, wherein the extrapolation of the velocity of the target shape into the velocity field of the entire simulated fluid object is by a linear extrapolation.

4. The computer-implemented method of claim 1, in which assigning at least one velocity constraint to the first portion of the simulated fluid object includes using the velocity of the target shape as a Neumann boundary condition in the pressure projection step of the fluid flow simulation.

5. The computer-implemented method of claim 1, in which the collection of calculated control forces includes a potential force applied to the second portion of the simulated fluid object.

6. The computer-implemented method of claim 1, in which the collection of calculated control forces includes a velocity matching force applied to the second portion of the simulated fluid object for matching a velocity of the second portion to a velocity of the target shape.

7. The computer-implemented method of claim 6, wherein the velocity matching force is a function of the difference of the velocity of the target shape and the fluid velocity.

8. The computer-implemented method of claim 1, in which the collection of calculated control forces includes a shape matching force applied to the second portion of the simulated fluid object for matching the shape of the second portion to the shape of the target shape.

9. The computer-implemented method of claim 1, in which the collection of calculated control forces is a weighted sum of a potential force, a velocity matching force and a shape matching force.

10. A computer program product tangibly embodied in a non-transitory information carrier and comprising instructions that when executed by a processor perform a method comprising:
defining a simulated fluid object that includes a first portion and a second portion, wherein the first portion is located within the second portion and a boundary of the second portion defines an outer surface of the simulated fluid object, the portions being defined by a signed distance function (SDF) so that the first portion is defined as a region of the simulated fluid object in which the SDF is less than or equal to a negative real number and the second portion is defined as a region of the simulated fluid object in which the SDF is both greater than the negative real number and less than or equal to 0;
performing a fluid flow simulation that includes the simulated fluid object;
during the fluid flow simulation assigning at least one velocity constraint to the first portion of the simulated fluid object to correspond to a velocity of a target shape;
applying during the fluid flow simulation at least one of a collection of calculated control forces to the second portion of the simulated fluid object; and
rendering results of the fluid flow simulation to generate at least one image of the simulated fluid object.

11. The computer program product of claim 10, in which the velocity of the target shape is extrapolated into the velocity field of the entire simulated fluid object.

12. The computer program product of claim 11, wherein the extrapolation of the velocity of the target shape into the velocity field of the entire simulated fluid object is by a linear extrapolation.

13. The computer program product of claim 10, in which assigning at least one velocity constraint to the first portion of the simulated fluid object includes using the velocity of the target shape as a Neumann boundary condition in the pressure projection step of the fluid flow simulation.

14. The computer program product of claim 10, in which the collection of calculated control forces includes a potential force applied to the second portion of the simulated fluid object.

15. The computer program product of claim 10, in which the collection of calculated control forces includes a velocity matching force applied to the second portion of the simulated fluid object for matching a velocity of the second portion to a velocity of the target shape.

16. The computer program product of claim 15, wherein the velocity matching force is a function of the difference of the velocity of the target shape and the fluid velocity.

17. The computer program product of claim 10, in which the collection of calculated control forces includes a shape matching force applied to the second portion of the simulated fluid object for matching the shape of the second portion to the shape of the target shape.

18. The computer program product of claim 10, in which the collection of calculated control forces is a weighted sum of a potential force, a velocity matching force and a shape matching force.

19. A system comprising:
a computing device comprising:
a memory configured to store instructions; and
a processor configured to execute the instructions to perform a method comprising:
defining a simulated fluid object that includes a first portion and a second portion, wherein the first portion is located within the second portion and a boundary of the second portion defines an outer surface of the simulated fluid object, the portions being defined by a signed distance function (SDF) so that the first portion is defined as a region of the simulated fluid object in which the SDF is less than or equal to a negative real number and the second portion is defined as a region of the simulated fluid object in which the SDF is both greater than the negative real number and less than or equal to 0;
performing a fluid flow simulation that includes the simulated fluid object;
during the fluid flow simulation assigning at least one velocity constraint to the first portion of the simulated fluid object to correspond to a velocity of a target shape;
applying during the fluid flow simulation at least one of a collection of calculated control forces to the second portion of the simulated fluid object; and
rendering results of the fluid flow simulation to generate at least one image of the simulated fluid object.

20. The system of claim 19, in which the velocity of the target shape is extrapolated into the velocity field of the entire simulated fluid object.

21. The system of claim 20, wherein the extrapolation of the velocity of the target shape into the velocity field of the entire simulated fluid object is by a linear extrapolation.

22. The system of claim 19, in which assigning at least one velocity constraint to the first portion of the simulated fluid object includes using the velocity of the target shape as a Neumann boundary condition in the pressure projection step of the fluid flow simulation.

23. The system of claim 19, in which the collection of calculated control forces includes a potential force applied to the second portion of the simulated fluid object.

24. The system of claim 19, in which the collection of calculated control forces includes a velocity matching force applied to the second portion of the simulated fluid object for matching a velocity of the second portion to a velocity of the target shape.

25. The system of claim 24, wherein the velocity matching force is a function of the difference of the velocity of the target shape and the fluid velocity.

26. The system of claim 19, in which the collection of calculated control forces includes a shape matching force applied to the second portion of the simulated fluid object for matching the shape of the second portion to the shape of the target shape.

27. The system of claim 19, in which the collection of calculated control forces is a weighted sum of a potential force, a velocity matching force and a shape matching force.

* * * * *